United States Patent [19]

Afshari

[11] Patent Number: 5,621,638
[45] Date of Patent: Apr. 15, 1997

[54] METHOD AND APPARATUS FOR OPTIMUM REGULATION OF THE INSIDE OF PREMISES

[75] Inventor: Afshin Afshari, Meudon, France

[73] Assignee: Schlumberger Industries, S.A., Montrouge, France

[21] Appl. No.: 506,614

[22] Filed: Jul. 24, 1995

Related U.S. Application Data

[63] Continuation of Ser. No. 103,375, Aug. 6, 1993, abandoned.

[30] Foreign Application Priority Data

Aug. 18, 1992 [FR] France .................... 92 10105

[51] Int. Cl.$^6$ .......................... G05B 13/02; F28D 19/00
[52] U.S. Cl. ........................... 364/148; 364/557
[58] Field of Search .................... 364/140–148, 364/152, 154, 550, 557, 570; 236/46 R, DIG. 8, 91 D; 165/12, 13, 14, 22, 26; 218/490–492

[56] References Cited

U.S. PATENT DOCUMENTS

| | | | |
|---|---|---|---|
| 4,215,408 | 7/1980 | Games et al. | 364/505 |
| 4,334,275 | 6/1982 | Levine | 364/551 |
| 4,771,392 | 9/1988 | Hall | 364/557 |
| 4,897,798 | 1/1990 | Cler | 364/505 |
| 5,115,967 | 5/1992 | Wedekind | 236/46 R |
| 5,289,362 | 2/1994 | Liebl et al. | 364/140 |

FOREIGN PATENT DOCUMENTS

3300082A1  7/1984  Germany .
3703000A1  8/1988  Germany .

*Primary Examiner*—Tan V. Mai
*Assistant Examiner*—Thomas E. Brown
*Attorney, Agent, or Firm*—Leonard W. Pojunas

[57] ABSTRACT

A method of controlling a device for producing or removing heat for the purpose of regulating the inside temperature of premises to comply with at least one reference q given in advance, in which, at each time instant that is separated from the following instant by a time interval Δt, a function J(u) is minimized over a duration T0 where J(u) characterizes the behavior of the inside temperature Ti of the premises, with:

$$J(u) = \int_t^{t+T0} \{qe^2 + ru^2\} dt$$

(where r is a dimensionless coefficient), this being done by a first order model of thermal behavior e(t) where:

$$e(t) = x(t) + au - y \text{ and}$$

$$dx/dt = fx(t,x) = -x/t + u(1-a)/t + w/t$$

where x(t) is a function representative of the thermal state of the structure of the premises, a is a (dimensionless) instantaneous response factor of said premises, u is a function of time characteristics of the power of the device for producing or removing heat, y represents the reference temperature, and t is the time constant of the exponential curve characteristics of variation in the inside temperature of the premises as in function of time.

19 Claims, 2 Drawing Sheets

METHOD AND APPARATUS FOR OPTIMUM REGULATION OF THE INSIDE OF PREMISES

This application is a continuation of application Ser. No. 08/103,375, filed on Aug. 6, 1993, now abandoned entitled A METHOD AND APPARATUS FOR OPTIMUM REGULATION OF THE INSIDE OF PREMISES.

FIELD OF THE INVENTION

The present invention relates to a method and apparatus for optimally regulating the inside temperature of premises by controlling the heating or cooling of the inside volume of the premises.

BACKGROUND OF THE INVENTION

When heating or cooling premises, it is necessary to establish a compromise between the comfort that is desired and the energy consumption that is necessary for achieving such comfort. Attempts at reducing energy consumption without sacrificing comfort have for a long time been directed to the thermal insulation of the premises. More recently, attempts have been made to control the inside temperature of the premises so as to maintain a desired degree of comfort by controlling a heater in such a manner as to cause such heater to operate for a minimum amount of time and/or at minimum power. In particular, attempts have been made to take into account the fact that the requirements of a user occupying premises in terms of quantity of heat to be supplied or removed vary from one day to another and even from one time of day to another, e.g. as a function of periods of non-occupation and/or of the alternation between day and night.

Since it is difficult, in general, to regulate the power of a heating device, proposals have been made to operate the heating device at full power but intermittently.

The oldest technique consists in fitting a heating device with a thermostat associated with a clock. Such a very rudimentary technique can achieve significant savings only at the cost of reduced comfort. Given the thermal inertia of the premises, obtaining a given comfort temperature after a period during which the heating device has been running low requires a period of "preheating" during which the heating device must operate at full power in order to bring the air in the premises gradually up to the comfort temperature (also referred to as the reference temperature).

Unfortunately, it is extremely difficult to determine the duration of the preheating period since it is a function of numerous parameters that are themselves difficult to determine or measure. If the preheating is too short, then there is a danger of the reference comfort temperature not being achieved at the desired time, whereas if preheating is too long, then there is wasteful consumption of energy.

Proposals have been made for an apparatus that switches a heating device on and off in compliance with a daily reference cycle that is fixed in advance. The cycle comprises two successive periods corresponding respectively to a low temperature (e.g. at night) and a comfortable temperature (by day). The preheating time that precedes the day or comfort temperature period is an empirical function of the inside and outside temperatures. This function is subsequently refined by iteration from one day to the next.

The above known apparatuses suffer from drawbacks. For example, they require considerable computer infrastructure devoted solely to regulating heating. Consequently they are relatively expensive and unsuitable for domestic type applications, e.g. for heating an individual accommodation.

Further, there is no guarantee that the iteration process will converge, and this can affect reliability.

In addition, even assuming that the iteration does converge, it reaches a solution only after several iteration cycles, i.e. after several days. This gives rise to a loss of comfort and/or to wasted energy consumption.

Furthermore, such apparatuses are inflexible insofar as they are capable of operating only on the basis of a very simple daily reference cycle that, in most cases, comprises a single "comfort" period corresponding to a "comfortable" temperature (about 20° C.), with the remainder of the cycle outside the comfort period corresponding to a lower temperature. Unfortunately, the requirements of an occupier of premises are generally more complex than that. As a result, apparatuses of the above type are not attractive for all users, in particular an individual accommodation or for small blocks of flats.

Finally, such known regulation apparatuses are unsuitable for combining with home controller systems installed in an individual accommodation to control other devices in the home, such as a security system or intercom etc., since they are not provided with appropriate communications interfaces for such home controller usage.

SUMMARY OF THE INVENTION

According to the present invention, there is provided a method of controlling a regulator for regulating the inside temperature of premises, comprising a device for performing an optimization calculation to calculate an optimum control value $u^*$ to control the regulator, the control value being calculated based on a measured temperature value w and at least one index representing the thermal characteristics of the premises as a function of the time of day, the at least one index being precalculated before the optimization calculation is performed.

The indices can include an index q representing the occupancy of the building or other precalculated indices.

The present invention also extends to an apparatus for carrying out all aspects of this method.

The present invention thus remedies the above drawbacks and proposes a method and apparatus for implementing a method of controlling a device for heating or cooling premises for the purpose of regulating the inside temperature of the premises to comply with at least one reference given by a user. The method of the invention has the advantage over the prior art of being associated with a computer that is relatively simple and therefore suitable for being used in the context of a home control installation that is already in place. Furthermore, the method of the invention makes it possible to operate on the basis of a reference that may be relatively complex, e.g. in the form of a daily temperature cycle, thus enabling the user to modulate the internal temperature of accommodation to comply with personalized requirements. In addition, the method of the invention provides increased reliability over prior art methods since it is not based on any empirical step or any iterative step.

The invention also provides a method of controlling a device for regulating the inside temperature of premises in compliance with at least one reference q given in advance, the method being characterized in that at each time instant is separated from a following instant by a time interval $\Delta t$, a function J(u) is minimized over a duration T0, where J(u) defines the behavior of the inside temperature of the premises:

$$J(u) = \int_t^{t+T0} \{qe^2 + ru^2\} dt$$

(where the function J is at a minimum for optimum temperature behavior) by using a model for thermal behavior e(t) where:

$$e(t) = x(t) + au - y \text{ and}$$

$$dx/dt = f(t,x) = -x/\tau + u(1-a)/\tau + w/\tau$$

where x(t) is a function representative of the thermal state of the structure of the premises, a is a dimensionless instantaneous response factor for the premises, u is a function of time characteristic of the power of a device for producing or removing heat, y represents the reference temperature, w is the external temperature and r is a dimensionless coefficient.

The invention also provides an apparatus for controlling a device that produce or remove heat for the purpose of regulating the inside temperature of premises to comply with at least one reference given in advance, the apparatus comprising a device for operating at each time instant separated from the following instant by a time interval $\Delta t$, to minimize a function J(u) over a duration T0, where J(u) is representative of the behavior of the inside temperature Ti of the premises, with:

$$J(u) = \int_t^{t+T0} \{qe^2 + ru^2\} dt$$

using a first order model for the thermal behavior e(t) where:

$$e(t) = x(y) + au - y$$

where x(t) is a function representative of the thermal state of the structure of the premises, a is a (dimensionless) instantaneous response factor for the premises, u is a function of time characteristic of the power of the device for producing or removing heat; and y represents the reference temperature.

BRIEF DESCRIPTION OF THE DRAWINGS

The invention will be well understood in the light of the accompanying drawings which show an illustrative embodiment of the invention, in which.

DETAILED DESCRIPTION OF THE PREFERRED EMBODIMENTS

Figure 1:
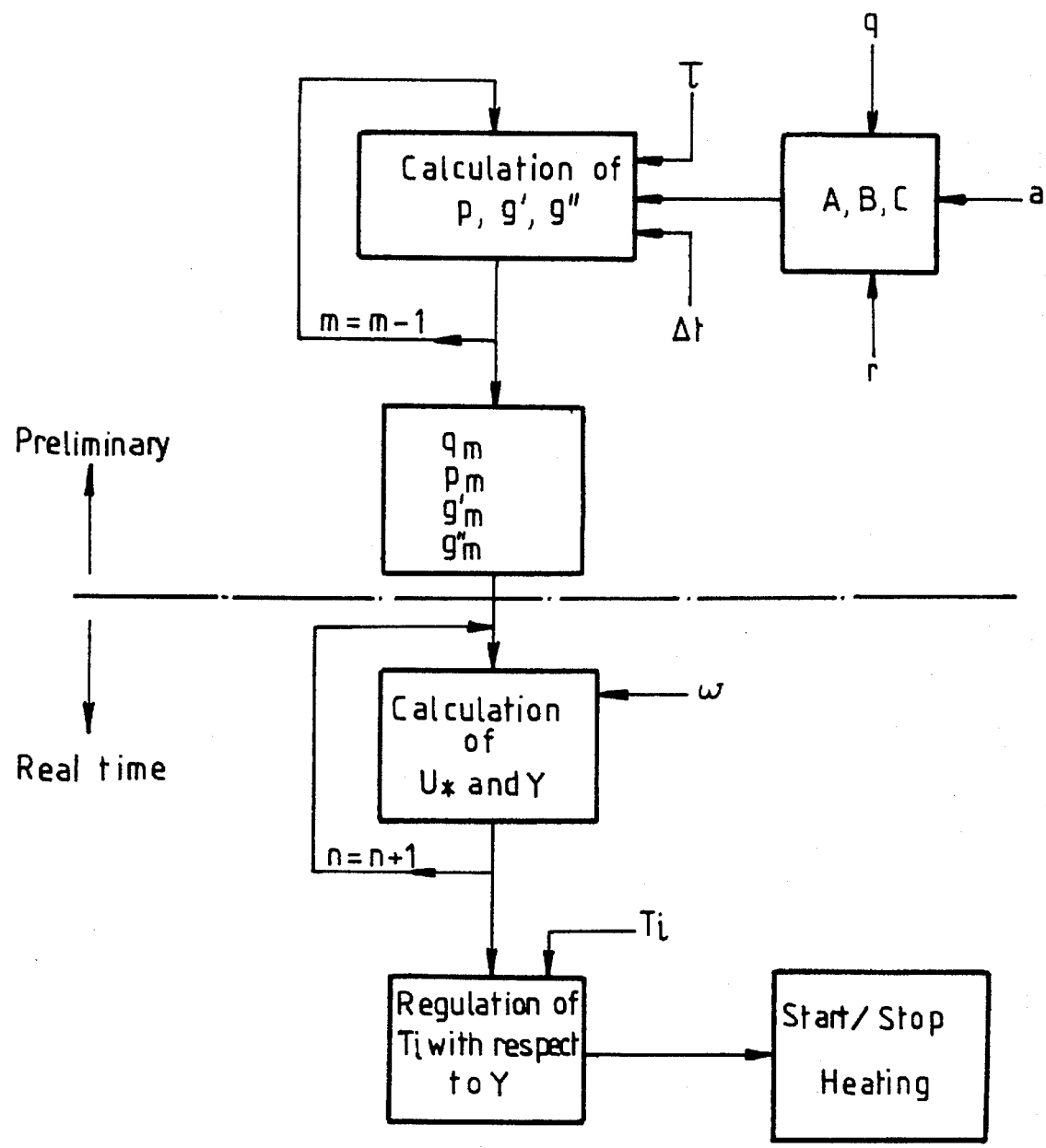
FIG. 1 is a flow chart of an algorithm used for minimizing the optimum control criterion (function J)

In the following example, the method of the invention and the apparatus for implementing it seek to determine optimum control of a heater operating, in particular during periods of occupation, to obtain an inside temperature of premises as close as possible to a reference temperature that is fixed in advance and that corresponds for example to periods of occupation of the premises. Naturally the invention could also be applied to controlling a heater for cooling a premises (an air conditioner). The concept of reference temperature is based on the assumption that the user determines in advance a daily occupation cycle. The cycle includes periods of occupation that correspond to a "comfort" temperature, with the remainder of the cycle corresponding to periods of non-occupation or to night time, and being associated with a lower temperature. For example, the reference or "comfort" temperature may lie in the range about 19° C. to about 23° C., whereas the lower or "economy" temperature (period of non-occupation or night time) may be about 16° C. or about 17° C., for example.

At each instant t, the control of the a heater minimizes an optimization criterion which is evaluated for a time interval [t, t+T0]. This criterion is computed by determining the thermal behavior of the structure of the premises together with its ambient air over the interval T0. The criterion is computed on a basis of the "sliding horizon" principle and is performed sequentially, being repeated at each step in time, where the step in time are separated by a time duration $\Delta t$.

An algorithm used in the invention minimizes the criterion over an interval T0 which is advantageously as long as possible (e.g. several days) so as to make it possible to achieve results that are reliable and accurate. However, the longer the interval T0, the longer the computation time. Long computation time can constitute a disadvantage in most applications. Thus, in accordance with the invention, an advantage is achieved with the assumption that the reference q(t) is a periodic function (of period T) so that computation is performed, in fact, only for the duration T (where T<T0). By way of example, the period T is advantageously equal to 24 hours. The 24 hour duration is subdivided into a succession of M time intervals $\Delta t$; e.g. M=239 so that $\Delta t$=0.1 hours.

According to a first characteristic of this embodiment, a portion of the computation is performed beforehand, i.e. before the period in which the apparatus for regulating the heater is actually put into use, while the remainder of the computation, seeking to minimize the criterion, is performed "in real time", i.e. while regulation is actually taking place.

By performing some computation in deferred time, it is possible to reduce the amount of computation that needs to be performed in real time, thereby enabling real time computation to be performed using a computer that is simple and therefore inexpensive.

The computation performed in real time makes use of tables of values that result from the prior computations together with measured values of the inside temperature of the premises and of the outside temperature.

According to another characteristic of this embodiment, the computation is performed digitally, thereby leading to further significant simplification.

According to another characteristic of this embodiment, account is taken of the periodic nature of premises occupation over a period T (of 24 hours, for example), thereby making it possible to simplify the digital computation and also making it possible to perform the computation using computer that is simple, and in particular of the type commonly used for home automation purposes.

The method of the embodiment includes an algorithm for computing variables and solving equations representative of the thermal behavior of the system, firstly by using parameters or constants that have previously been established by the user and secondly by using values derived from measurements, e.g. the temperature inside the premises and the temperature outside.

Once an optimization criterion has been minimized for a given instant, an optimum reference temperature is obtained. The inside temperature of the premises is regulated (e.g. by on/off thermostatic type regulation) by acting on the heater to keep the real temperature of the premises as close as possible to the optimum reference temperature.

More precisely, the optimization criterion is expressed in the form of the following function J(t):

$$J(u) = \int_{t}^{t+T0} \{qe^2 + ru^2\} dt \quad (1)$$

The function J(t) is evaluated for a time horizon of length T0; q(t) is the comfort index and represents a function that takes the values 1 or 0 as a function of time, depending on whether or not the comfort temperature is required; r is a coefficient characteristic of the compromise between comfort and economy, with r being determined empirically and having a value of about 0.001; u(t) is a time function characteristic of heating power and is expressed in °C. It should be observed that the function u is normalized and represents the maximum difference in temperature that can be maintained between the inside and the outside of the premises. E(t) is a time function representing the difference between the temperature Ti inside the premises and the reference temperature y and constitutes a first order model representing thermal behavior of the system over time, with:

$$dx/dt = f(t,x) = -x/\tau + u(1-a)/\tau + w/\tau \quad (2)$$

$$e = x + au - y$$

where a is a dimensionless constant representative of the instantaneous response of the heater; a being typically in the range 0.1 to 0.2; x(t) is a function of time representing the thermal state of the premises and may be considered as being the mean temperature of the structure of the premises expressed in °C., e.g. the temperature of the walls of the premises; thus giving Ti=x+au; where the factor a is determined empirically and has a value of about 0.15, for example; w(t) represents outside temperature in °C.; τ represents the time required to bring the temperature of the structure of the premises to the reference temperature, τ being taken as a time constant for the exponential curve characteristic of variation in the inside temperature of the premises as a function of time in response to a heating reference; τ is determined empirically and may be about 30 hours to 70 hours, for example.

According to a characteristic of this embodiment, the e model characteristic of the thermal behavior of the system is a dynamic model of the first order, thereby making it possible to simplify computation without sacrificing reliability.

Minimizing the function J, in other words equation (1), consists in determining a control value u* such that dJ/du=0, with this being done at each time step that is separated from the following step by a time interval Δt, which leads to:

$$u^* = \{aq(y-x) - (1-a)(px-g)\}/rho \quad (3)$$

where rho is equal to $r+a^2q$ and the functions p(t) and g(t) are obtained by solving the following system of equations backwards in time for the variables P and G, over the time interval [t, t+T0]

$$(4) \begin{cases} \frac{dP}{dt} = f_P(t,P) = \frac{1}{\tau}\{AP^2 + 2BP + C\} \\ \frac{dG}{dt} = f_G(t,G) = \frac{1}{\tau}\{(AP+B)G + [C+(B-1)P]y + Pw\} \end{cases}$$

where the coefficient A(t), B(t), and c(t) are given by:

$$A = \frac{(1-a)^2}{r+a^2q} \quad B = 1 + \frac{(1-a)aq}{r+a^2q} \quad C = -\frac{rq}{r+a^2q} \quad (5)$$

where the parameters mentioned in equations (3, 4, and 5) are as defined above.

The following substitutions are then made p(t)=P(t) and g(t)=G(t). Equation (4) is solved numerically over the time interval [t, t+T0], and this is done backwards in time for each instant $t_m = m\Delta t$ where Δt is the sampling period or time interval separating two successive calculation instants. Equation (4) is solved from its final conditions:

$$P(t+T0) = P_F$$

$$G(t+T0) = G_F$$

and on the following assumptions:

T0 tends to infinity;

the function q(t) representing the comfort index is a periodic function having a period of 24 hours, for example, this value being set according to the occupancy of the building and stored in a table of values beforehand; and the present value (i.e. as measured) of the outside temperature w(t) can be used in computing the criterion for optimizing J(t).

The above assumptions make it possible to deduce the following corollaries:

whatever the final conditions $P_F$ and $G_F$, P and G can be considered as being periodic functions, having a period of 24 hours;

p(t) and g(t) depend on q(t) and w(t) only;

p is a periodic function having the same period as the reference q(t), i.e. 24 hours, and it is thus possible, given a priori knowledge of the daily variation in q(t), to compute once and forever its behavior over the interval [0,24] in hours, with the following limit condition: p(0)=p(24), on the basis of equation (4), where p=P; and the periodicity of G makes it possible to perform prior computation of the periodic functions g'(t) and g"(t) such that g=g'y+g"w.

Equation (4) is solved by numerical integration on the basis of the following approximations for the time derivatives:

$$(6) \begin{cases} \frac{P_{m+1} - P_m}{\Delta t} = f_P(t_m, P_m) \\ \frac{G_{m+1} - G_m}{\Delta t} = f_G(t_m, G_m) \\ \frac{x_{m+1} - x_m}{\Delta t} = f_x(t_m, x_m) \end{cases}$$

Then, the following substitution is made p=P. Numerically solving the system of equations (4) by making it discrete leads to:

$$(7) \begin{cases} A_m p_m^2 + 2\left(B_m + \dfrac{\tau}{2\Delta t}\right) p_m + C_m = \dfrac{\tau}{\Delta t} p_{m+1} \\ \left(A_m p_m + B_m + \dfrac{\tau}{\Delta t}\right) G_m + [(B_m - 1)p_m + \\ C_m]y + p_m w = \dfrac{\tau}{\Delta t} G_{m+1} \end{cases}$$

The prior computation is based on the system of equations (7) which gives p directly. Concerning g this is deduced from G. Since the recurrence relationship giving $G_m$ as a function of $G_{m+1}$ is linear, it is possible to express $G_m$ as a function of $G_{m+24/\Delta t}$. At the sampling instant tm and assuming that G is periodic, i.e. that $G_m = g_m + 24/\Delta t$., $g_m = G_m$ is obtained as a function of y and $w_m$:

$$g_m = g'_m y + g''_m w_m \tag{8}$$

where the periodic coefficients $g'_m$ and $g''_m$ can be computed given that at sampling instant $t_n$, the criterion $J_m$ is evaluated over the period T0 without it being necessary to have a priori knowledge of any change in outside temperature (w) since it is assumed to be constant over the period T0. It should be observed that the function g is not periodic since the measured value for w is not periodic.

M discrete values are thus computed for the function p(t), using $M = 24/\Delta t$, using the following iterative algorithm:

$$
\begin{aligned}
& p_0 = 0 \\
& \delta = 1 \\
& \text{while } \delta \geq 10^{-6} \text{ do} \\
& \quad p_M = p_0 \\
& \quad m = M - 1 \\
& \quad \text{while } m \geq 0 \text{ do} \\
& \quad \quad z = (B_m + \tau/2\Delta t)^2 \\
& \quad \quad z = z - A_m(C_m - p_{m+1}\tau/\Delta t) \\
& \quad \quad z = \sqrt{z} - (B_m + \tau/2\Delta t) \\
& \quad \quad p_m = z/A_m \\
& \quad \quad m = m - 1 \\
& \quad \delta = |p_M - p_0|
\end{aligned} \tag{9}
$$

Similarly, M discrete values of g'(t) and g''(t) are computed for the function g with $M = 24/\Delta t$, and using the following iterative algorithm:

$$
\begin{aligned}
& m = M - 1 \\
& \text{while } m \geq 0 \text{ do} \\
& \quad \alpha_m = \alpha_{m+M} = \{1 + (\Delta t/\tau)(B_m + A_m p_m)\}^{-1} \\
& \quad \beta_m = \beta_{m+M} = -(\Delta t/\tau)\{C_m + (B_m - 1)p_m\} \\
& \quad \gamma_m = \gamma_{m+M} = -p_m \tau/\Delta t \\
& \quad m = m - 1 \\
& m = M - 1 \\
& \text{while } m \geq 0 \text{ do}
\end{aligned} \tag{10}
$$

$$g'_m = \dfrac{\sum_{i=0}^{M-1} \left\{ \prod_{i=0}^{k} \alpha_{m+1} \beta_{m+k} \right\}}{1 - \prod_{i=0}^{M-1} \alpha_{m+1}}$$

$$g''_m = \dfrac{\sum_{i=0}^{M-1} \left\{ \left( \prod_{i=0}^{k} \alpha_{m+1} \gamma_{m+k} \right) \right\}}{\left\{ 1 - \prod_{i=0}^{M-1} \alpha_{m+1} \right\}}$$

$$m = m - 1$$

The computation of the indexes q, p, g' and g" representing the thermal characteristics of the building as a time of day, including the occupancy q of the building, are performed beforehand, i.e. before implementing the apparatus of the invention and the method of controlling heater. For example, this means that the computations can be performed on the basis of information corresponding to a given daily occupation cycle (q) for given premises and a given heater. The calculations provide a table of values for each of q, p, g', and g". For example, each table may comprise several hundred values for each parameter, giving a grand total of up to about one thousand values.

The steps of the method concerned with calculating and minimizing the optimization criterion as described below are performed in real time, i.e. while the method and the apparatus are actually in use for the purpose of controlling the heating so as to regulate the inside temperature of premises to comply with a given reference.

The real-time computation uses the values recorded in the above-mentioned tables for the variables $p_m$, $g'_m$, $g''_m$ and $q_m$, for $m = 0, \ldots, M-1$. It should be observed that in the assumptions on which the above computations are based, the step $\Delta t$ used in the prior computation is equal to the step used in the real-time computation, lying, for example, in the range about 1 minute to about 10 minutes, and preferably in the range 5 minutes to 6 minutes. At sampling instant $t_n = n\Delta t$, where m is the remainder after dividing n by M, the algorithm of the invention calculates the optimum reference $Y_n$ as follows:

$$g_n = g'_m y + g''_m w_n \tag{11}$$

$$u_n = \dfrac{1}{r + a^2 q_m} [aq_m(y - x_n) - (1 - a)(p_m x_n - g_n)]$$

$$Y_n = x_n + a u_n$$

where y (comfort reference) is given, $w_n$ is measured, $p_m$, $g'_m$, $g''_m$, and $q_m$ are given in the corresponding tables provided by the prior computations, and a and r are constants that are given, as described above. Thereafter, a new estimate is made of the state of the system:

$$x_{n+1} = \left(1 - \dfrac{\Delta t}{\tau}\right) x_n + \dfrac{\Delta t}{\tau}(1 - a)u_n + \dfrac{\Delta t}{\tau} w_n \tag{12}$$

where $x_{n+1}$ represents the state of the system, i.e. the temperature of the structure at the following instant $t_{n+1} = (n+1)\Delta t$. It may be observed that it is not necessary for the user to know the temperature of the structure since it is estimated by equation (12).

The initial value x of the state of the system is not critical and may be estimated.

The above equations lead to the optimum reference $Y_n$ for minimizing the function $J(t_n)$.

Once the optimization criterion J has been minimized, the heater receives an ON or OFF instruction as a function of the result of the calculation, for the purpose of regulating the temperature of the premises as a function of the optimum reference. The instruction from the apparatus of the invention is conveyed to the heater by any suitable known apparatus.

Tests have been performed for regulating the heating of premises in a set of dwellings using the method and the apparatus of the invention.

Figure 2:
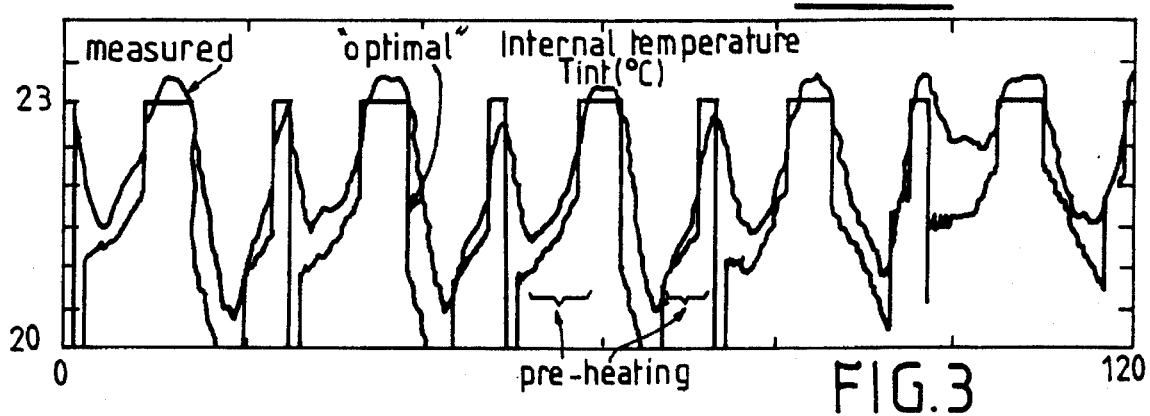
FIG. 2 shows one example of how the inside temperature of the premises may vary as a function of time, respectively as actually measured and as corresponds to optimum behavior as computed by the algorithm of the invention.
Figure 3:
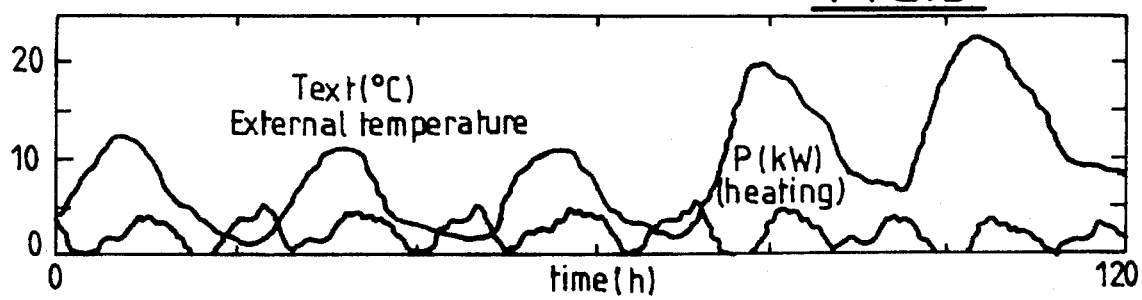
FIG. 3 shows how outside temperature (continuous line) and mean heating power (discontinuous line) vary over the same period of time as that shown in FIG. 2.

FIGS. 2 to 4 show measurements and computations performed during those tests.

FIG. 2 shows how the optimum reference Y and how the inside temperature Ti of the premises varies as a function of time.

FIG. 3 shows how outside temperature w and mean heating power varied over the same period of time and in the same example as given in FIG. 2.

Figure 4A:
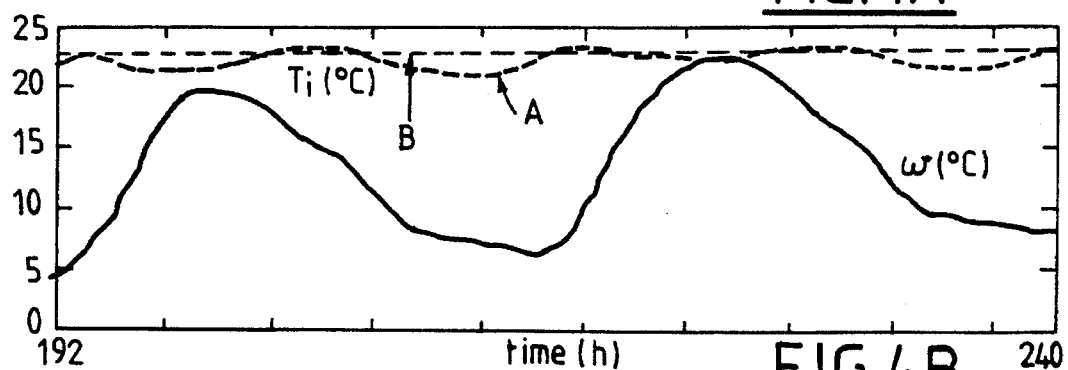
FIG. 4A shows how outside temperature (continuous line) and inside temperature (discontinuous line) vary respectively for a first premises B acting as a control and for second a premises A fitted with optimum regulation in accordance with the invention.

FIG. 4A shows another example of a result of the test, showing how inside temperature Ti and outside temperature w varied respectively for a dwelling (A) provided with an apparatus of the invention and a control dwelling (B) in which regulation was performed using a constant comfort temperature reference of 23° that was uniform over the measurement period. The temperature regulation of house A obeys the setting q(t)=1 for 7<t<9 or 17<t<22 and q(t)=0 for other values of t (in hours).

In FIG. 4A, the dashed line curves represent inside temperature and the solid line curve represents outside temperature. The dashed line curve corresponds to dwelling B while the widely-spaced undulating dashed line curve corresponds to dwelling A.

Figure 4B:
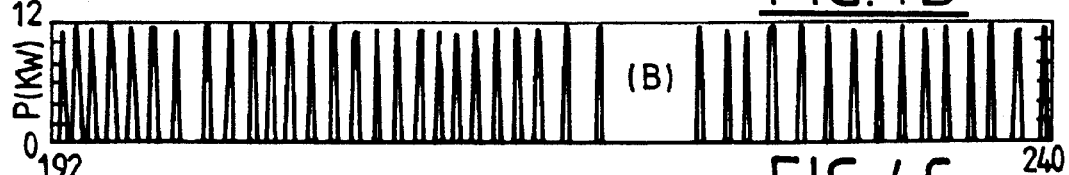
FIGS. 4B and 4C show changes in heating power consumption, respectively for the control premises B and for the premises A.
Figure 4C:
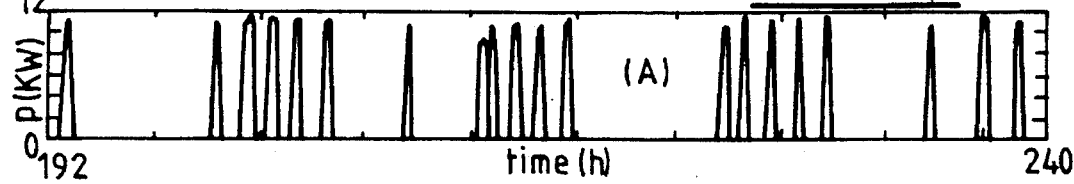

FIGS. 4B and 4C show how much heating power was used respectively for dwelling B and for dwelling A. It can be seen that to achieve the same degree of comfort in both dwellings (during periods of occupation) the heater was used less often in dwelling A. In the example given, the measured saving that resulted therefrom was about 33%.

The method of the invention may be varied to improve results.

For example, the normalized power may lie between two limit values so as to take account of the physical limitations of the heater, which is typically, 0° C.≦u≦30° C. In addition, the optimum reference Y may have a lower limit during the "economy" period (q=0) and may be equal to y during the "comfort" periods (i.e. when q=1). Likewise, computation of optimum control may include an activation threshold (if y≦y−w, then u=0) and also hysteresis, thereby preventing the heater from being activated and deactivated in succession at too high a frequency since that could damage the heater severely. Finally, although it is not strictly necessary to measure or to estimate the temperature of the structure, i.e. the walls of the premises, computations can be improved by doing so. The temperature of the structure may be estimated, for example, by a Kalman state estimator.

The method of the invention can be implemented on a small computer and requires computations that are relatively simple, in particular because of the simplifying assumptions, but that does not reduce its reliability. More particularly, certain parameters are not measured but are merely estimated, e.g. the temperature of the structure. Finally, the prior computations offer a high degree of flexibility in use and in installation by making it possible to program certain parameters in advance, which parameters may be stored in a memory card and then read on site prior to use and regulation proper.

It should be observed that the 24-hour periodicity of the functions p, g', and g" stems from the basic assumption that the function q(t) has a period of 24 hours.

It is not necessary for the prior computations and for the real-time computations to be performed using the same time interval (Dt) even though the above description assumes that the same time interval is used in both cases. By way of illustration, it may be assumed that the time interval for the prior computation that gives rise to the table of values for p, q, g', and g" is 6 minutes, while the time interval for real-time computations is 3 minutes. If the real-time computations at instant 0 make use of corresponding values in the table, then at the following instant for the real-time computation (i.e. at instant +3 minutes), the table of values does not have any values for the instant +3, since the prior computation was performed for 6 minute intervals (instants 0, +6, +12, . . . ). However, as real-time computation advances, it is possible to calculate intermediate values for instant +3, on the basis of the values in the table for instants 0 and +6, e.g. by linear interpolation.

I claim:

1. A method of controlling a regulating means for regulating an inside temperature of premises, comprising the steps of performing an optimization calculation to calculate an optimum control value u* to control the regulating means, the control value being calculated based on a measured temperature value w and at least one index representing a thermal characteristic of the premises as a function of a time of day, the at least one index being precalculated before the optimization calculation is performed wherein the control value u* is chosen to minimize J(u) and wherein, at each instant in time that is separated from a following instant in time by an interval $\Delta t$, the function J(u) is minimized over a duration T0, with:

$$J(u)=\int_t^{t=T0} \{qe^2+ru^2\} dt;$$

with a first order model of thermal behavior e(t) where:

$$e(t)=x(t)+au-y \text{ and}$$

$$dx/dt=f(t,x)=-x/\tau+u(1-a)/\tau+w/\tau;$$

where x(t) is a function representative of a thermal state of a structure of the premises, q is a preset reference function, a is an instantaneous response factor of said premises, u is a function of time of a power supplied to means for producing or removing heat, w is an external temperature, r is a dimensionless coefficient, y represents a reference temperature, and $\tau$ is a time constant of an exponential curve characteristic of a variation in the inside temperature of the premises over time.

2. A method according to claim 1, wherein u* is computed at each instant in time separated from a following instant in time by a time interval DELTAt.

3. A method according to claim 2 wherein said time intervals $\Delta t$ and DELTAt are equal to each other.

4. A method according to claim 2, wherein said period T of p(t), g'(t), g"(t), and q(t) is 24 hours.

5. A method according to claim 1, wherein the outside temperature w is measured at each instant in time, with e(t) representing a difference between the inside temperature Ti and the reference temperature y.

6. A method according to claim 1, further comprises a step of applying substantially constant-power ON/OFF control to said means for producing or removing heat.

7. A method of controlling a regulating means for regulating an inside temperature of premises, comprising the steps of performing an optimization calculation to calculate an optimum control value u* to control the regulating means, the control value being calculated based on a measured temperature value w and at least one index representing a thermal characteristic of the premises as a function of a time of day, the at least one index being precalculated before the optimization calculation is performed wherein the optimization calculation is performed in compliance with at least one predetermined reference function q, and wherein the optimum control value u* is computed as follows:

$$u^*=\{aq(y-x)-(1-a)(px-g)\}/rho;$$

where a is a dimensionless factor representing an instantaneous response of means for producing heat; x is a function of a structure of the premises; p is a precalculated index representing one thermal characteristic of the premises and being a periodic function of time of a period T; y is a reference temperature; g(t)=g'y+g"w, with g'(t) and g"(t) being periodic functions of period T and being precalculated indices representing thermal characteristics of the premises;

rho is equal to $r+a^2q$; the measured temperature value w is an outside temperature; and r is a dimensionless coefficient.

8. A method according to claim 7, wherein for each instant in time separated from a following instant in time by an interval $\Delta t$, discrete values are predetermined for p, g', and g" on a basis of making the following equations discrete as a function in time:

$$\frac{dP}{dt} = f_P(t,P) = \frac{1}{\tau}(AP^2 + 2BP + C);$$

$$\frac{dG}{dt} = f_G(t,G) = \frac{1}{\tau}(AP+B)G + [C + (B-1)P]y + Pw;$$

$$A = \frac{(1-a)^2}{r+a^2q} \quad B = 1 + \frac{(1-a)aq}{r+a^2q} \quad C = \frac{rq}{r+a^2q};$$

$\tau$ is a time constant of an exponential curve characteristic of a variation in the inside temperature of the premises as a function of time, and r is a dimensionless coefficient.

9. A method according to claim 8, wherein numerical values of the variables in the equations for dP/dt and dG/dt are computed at instants $t_m = mDt$ on a basis of the following approximations for time derivatives:

$$\frac{P_{m+1} - P_m}{\Delta t} = f_P(t_m, P_m)$$

$$\frac{G_{m+1} - G_m}{\Delta t} = f_G(t_m, G_m).$$

10. A method according to claim 7, wherein said reference function is represented in a form of a periodic time function q(t) of a period T, with q(t)=1 when a comfort reference is required and q(t)=0 for when said comfort reference is not required.

11. A method according to claim 2, it further comprising a step of determining the temperature of the structure of a premises.

12. A method according to claim 7, wherein an optimum reference Y for each instant $t_n = n\Delta t$ is calculated on a basis of values of p, g', g", q and x, y, w determined from the following equations, with m being a remainder after dividing n by $M = T/\Delta t$:

$$g_n = g'_m y + g''D_m w_n$$

$$u_n = \frac{1}{r + a^2 q_m}[aq_m(y - x_n) - (1-a)(p_m x_n - g_n)]$$

$$Y_n = x_n + au_n$$

$$x_{n+1} = \left(1 - \frac{\Delta t}{\tau}\right)x_n + \frac{\Delta t}{\tau}(1-a)u_n + \frac{\Delta t}{\tau}w_n.$$

13. A method according to claim 12, wherein the function u is such that:

if $u \leq y - w$, then $u = 0$ with w being the outside temperature.

14. A method according to claim 7, wherein a lies in a range of 0.1 to 0.2; t lies in a range of 30 hours to 70 hours; and r lies in a range of 0.0001 to 0.01.

15. An apparatus for controlling a regulating means for regulating an inside temperature of premises, the apparatus performing an optimization calculation to calculate an optimum control value u* to control the regulating means, the control value being calculated based on a measured temperature value w and at least one index representing a thermal characteristic of the premises as a function of a time of day, values of the at least one index being precalculated before the optimization calculation and a memory card for storing the values of said at least one index, wherein the control value u* is chosen to minimize J(u) and wherein, at each instant in time that is separated from a following instant in time by an interval $\Delta t$, the function J(u) is minimized over a duration T0, with:

$$J(u) = \int_t^{t=T0} \{qe^2 + ru^2\} dt;$$

with a first order model of thermal behavior e(t) where:

$$e(t) = x(t) + au - y \text{ and}$$

$$dx/dt = f(t,x) = -x/\tau + u(1-a)/\tau + w/\tau;$$

where x(t) is a function representative of a thermal state of a structure of the premises, q is a present reference function, a is an instantaneous response factor of said premises, u is a function of time of a power supplied to means for producing or removing heat, w is an external temperature, r is a dimensionless coefficient, y represents a reference temperature, and $\tau$ is a time constant of an exponential curve characteristic of a variation in the inside temperature of the premises over time.

16. An apparatus as set forth in claim 15, wherein the optimization calculation is performed in compliance with at least one predetermined reference function q, and wherein the optimum control value u* is computed as follows:

$$u^* = \{aq(y-x) - (1-a)(px-g)\}/rho;$$

where a is a dimensionless factor representing an instantaneous response of means for producing heat; x is a function of a structure of the premises; p is a precalculated index representing one thermal characteristic of the premises and being a periodic function of time of a period T; y is a reference temperature; g(t) = g'y + g"w, with g'(t) and g"(t) being periodic functions of period T and being precalculated indices representing thermal characteristics of the premises; rho is equal to $r + a^2 q$; the measured temperature value w is an outside temperature; and r is a dimensionless coefficient.

17. An apparatus as set forth in claim 16, wherein for each instant in time separated from a following instant in time by an interval $\Delta t$, discrete values are predetermined for p, g', and g" on a basis of making the following equations discrete as a function in time:

$$\frac{dP}{dt} = f_P(t,P) = \frac{1}{\tau}(AP^2 + 2BP + C);$$

$$\frac{dG}{dt} = f_G(t,G) = \frac{1}{\tau}(AP+B)G + [C + (B-1)P]y + Pw;$$

$$A = \frac{(1-a)^2}{r+a^2q} \quad B = 1 + \frac{(1-a)aq}{r+a^2q} \quad C = \frac{rq}{r+a^2q};$$

$\tau$ is a time constant of an exponential curve characteristic of a variation in the inside temperature of the premises as a function of time, and r is a dimensionless coefficient.

18. An apparatus as set forth in claim 16, further comprising means for determining a temperature of the structure of the premises.

19. An apparatus as set forth in claim 15, further comprising means for applying substantially constant-power ON/OFF control to said means for producing or removing heat.

* * * * *